United States Patent [19]
Day, III et al.

[11] Patent Number: 5,395,199
[45] Date of Patent: Mar. 7, 1995

[54] AUTOMATED STORAGE LIBRARY WITH HORIZONTAL ARRAY OF STORAGE CELLS

[75] Inventors: Kenneth F. Day, III; Tarek Makansi, both of Tucson, Ariz.

[73] Assignee: International Business Machines Corporation, Armonk, N.Y.

[21] Appl. No.: 203,731

[22] Filed: Feb. 28, 1994

Related U.S. Application Data

[63] Continuation of Ser. No. 841,173, Feb. 25, 1992, abandoned.

[51] Int. Cl.6 ............................................... B65G 1/04
[52] U.S. Cl. .................................... 414/267; 364/478; 414/273; 414/281; 414/277; 414/618; 360/92; 901/1; 180/168
[58] Field of Search ............... 414/267, 331, 269, 270, 414/273, 274, 618, 277, 278, 279, 280, 281, 282, 283, 284, 285, 286, 146, 266; 901/1; 180/167, 168, 169; 364/478, 479, 424.62, 424.01; 360/92

[56] References Cited

U.S. PATENT DOCUMENTS

| | | |
|---|---|---|
| 4,088,232 | 5/1978 | Lilly . |
| 4,860,133 | 8/1989 | Baranski ........................ 414/281 X |
| 4,906,159 | 3/1990 | Sabo et al. ..................... 414/273 X |
| 4,966,513 | 10/1990 | Motoda ............................... 414/277 |
| 5,133,632 | 7/1992 | Aramaki et al. .................... 414/283 |

FOREIGN PATENT DOCUMENTS

| | | | |
|---|---|---|---|
| 105258 | 9/1966 | Denmark ........................... 414/281 |
| 34859 | 9/1981 | European Pat. Off. ............ 414/273 |
| 0072571 | 8/1982 | European Pat. Off. . |
| 193801 | 7/1990 | Japan ................................. 414/273 |
| 1384778 | 2/1975 | United Kingdom ............... 414/273 |
| 8701538 | 3/1987 | WIPO ................................. 414/273 |

OTHER PUBLICATIONS

SMPTE Journal–pp. 221 to 223–vol. 88, No. 4, Apr. 1979.

Primary Examiner—Frank E. Werner
Attorney, Agent, or Firm—M. W. Schecter

[57] ABSTRACT

The invention is an automated storage library including one or more robotic accessors which move upon the surface of a horizontal plane including the openings to storage cells. The accessors are wireless, remotely controlled vehicles. The vehicles employ known tracking mechanism(s) to move between locations within the library. The storage cells are embedded beneath the horizontal surface. The horizontal plane is a floor which is formed by the surface of the storage cells. Openings in the floor are also the access openings to the storage cells. Storage media are raised and lowered into the storage cells by a picker mechanism on the vehicles.

14 Claims, 3 Drawing Sheets

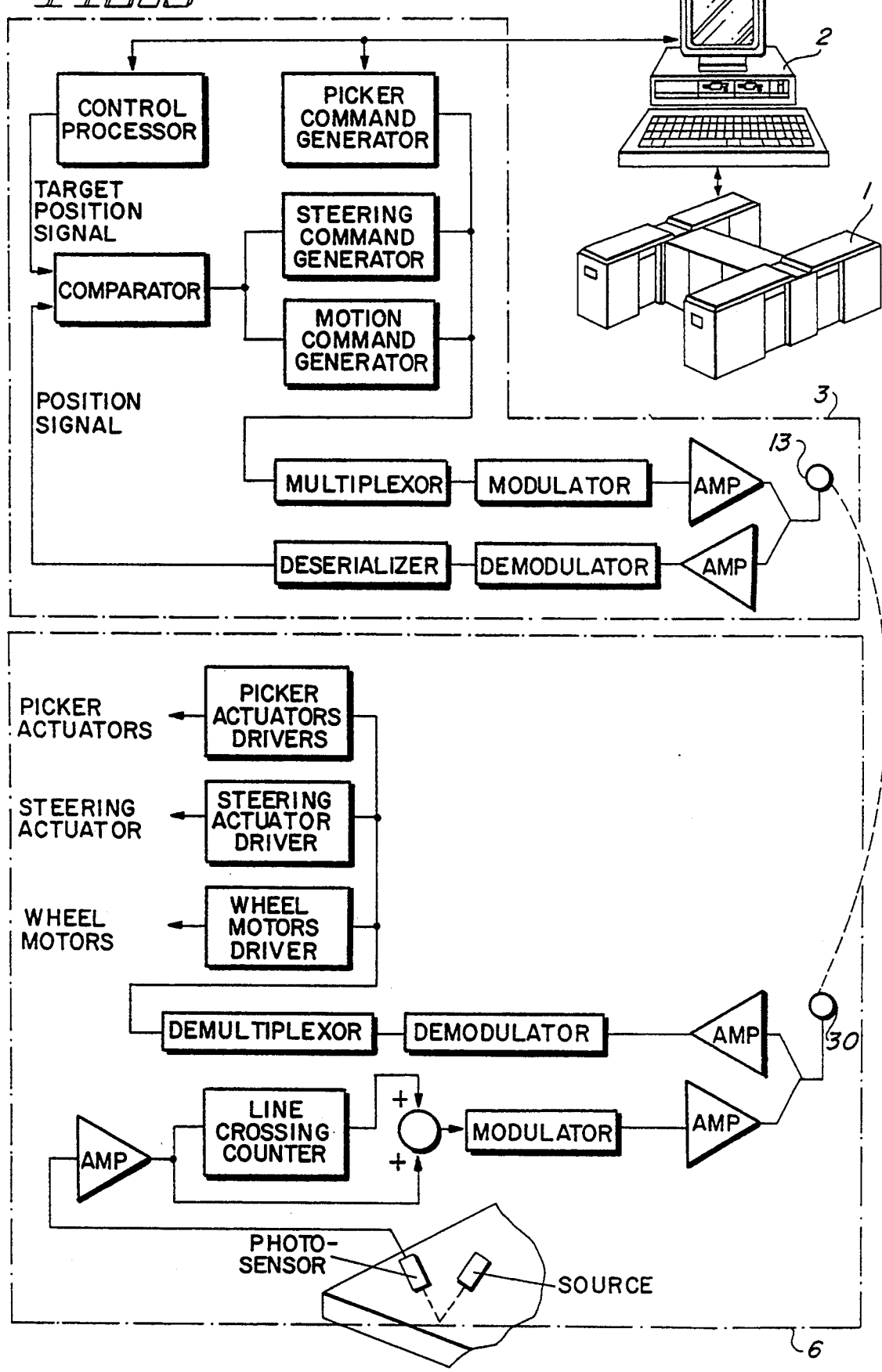

AUTOMATED STORAGE LIBRARY WITH HORIZONTAL ARRAY OF STORAGE CELLS

This Application is a continuation of application Ser. No. 07/841,173, filed Feb. 25, 1992, now abandoned.

BACKGROUND OF THE INVENTION

1. Field of the Invention

This invention relates to an improved automated storage library. More particularly, the invention is an automated storage library including one or more robotic accessors which move upon the surface of a horizontal plane including the openings to storage cells.

2. Description of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, and optical recording devices. These memory devices store data on storage media, such as disks and tapes. Peripheral storage devices have a greater storage density and lower cost than main memory, but fail to provide the same performance. For example, the time required to properly position a tape or disk beneath a read/write mechanism of a drive cannot compare with the rapid, purely electronic data transfer rate of main memory.

It is inefficient to store all of the data in a computer system on a single type of memory device. It is too costly to store all of the data in main memory and performance is reduced too much to store all of the data on peripheral storage devices. Thus, a typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often to referred to as secondary data storage, and so on. Generally, the highest level of the hierarchy has the lowest storage density capability, highest performance and highest cost. As one proceeds down through the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

The need for memory is expanding. Data to be stored may include coded data and uncoded data, such as images. Images may be included in engineering drawings, financial and insurance documents, medical charts and records, etc. Images can take many forms, and therefore cannot be encoded into the binary 0's and 1's of computers as easily and compactly as text. Most of the world's data, particularly image data, is still stored on paper. The cost of filing, storing, and retrieving such paper documents including image data is escalating rapidly. It is no longer acceptable to maintain rooms or warehouses stocked full of documents which must be retrieved manually when access thereto is required. Optical scanners are now capable of converting images into machine readable form for storage on peripheral storage devices, but the storage space required for the image data—although significantly less than that required for paper documents—is still quite large. Numerous disks or tapes are required for most business applications. Automated storage libraries have thus been developed to manage the storage of such disks and tapes.

Automated storage libraries include a plurality of storage cells for retaining removable data storage media, such as magnetic tapes, magnetic disks, or optical disks, a robotic accessor mechanism, and one or more internal peripheral storage devices. Each data storage medium may be contained in a cassette or cartridge housing for easier handling by the accessor. The accessor operates on command to transfer the data storage media between the storage cells and the internal peripheral storage devices without manual assistance. Once a data storage medium is mounted in an internal peripheral storage device, data may be written to or read out from that medium for as long as the system so requires. Data is stored on a medium in the form of one or more files, each file being a logical data set. The internal peripheral storage devices and storage cells may be considered distinct levels of a data storage hierarchy. In addition, data storage media in shelf storage (i.e. not in the storage cells, but instead outside the reach of the robotic accessor without manual intervention) may be considered yet another level of a data storage hierarchy.

Several automated storage libraries are known. IBM Corporation introduced the 3850 Mass Storage Subsystem for the storage and retrieval of magnetic tape modules in the 1970's. This library stored tape modules in a stationary, honeycombed array of storage cells. The array was planar and oriented vertically. Tape modules were moved horizontally into and out of the storage cells and tape drives by the accessor.

More recently, several firms have introduced automated storage libraries for magnetic tape cartridges and optical disks. These libraries include numerous variations in configuration, but always arrange the storage cells in a vertical array. For example, U.S. Pat. No. 4,654,727 discloses a magnetic tape cartridge library in which columns of stationary storage cells are arranged in a generally circular array. The openings of the storage cells face the center of the array, where the accessor is located. Although the storage cells tilt downward from their openings, the openings are arranged in one or more vertical planes.

Another magnetic tape library is disclosed in U.S. Pat. Nos. 4,864,438, and 4,864,511. The configuration of this library is similar to that disclosed in U.S. Pat. No. 4,654,727, except that an accessor may access two stationary arrays of storage cells. The arrays are generally circular and concentric. The accessor is located between the arrays. The openings of the inner array face outward and the openings of the outer array face inward. The openings of the storage cells are again arranged in one or more vertical planes.

Yet another magnetic tape library is disclosed in U.S. Pat. No. 4,271,440. This library includes storage cells arranged in circular arrays which can be rotated to bring a particular cell to a position of close proximity to an accessor. Again, the openings of the storage cells are arranged vertically. Additional library configurations are known, but the openings of the storage cells are always arranged vertically. An example of a magnetic tape library with such an arrangement can be found in U.S. Pat. No. 5,015,139. Examples of optical disk libraries with such an arrangement can be found in U.S. Pat. Nos. 4,271,489, 4,527,262, 4,614,474, 4,608,679, 4,766,581, and in the IBM 3995 Optical Library Dataserver.

Several factors are known to affect library efficiency, including storage capacity, expandability, moving mass, connectivity, failure points, and flexibility. Storage capacity is the amount of data that may be contained within a library. Expandability is the ability to increase the storage capacity of a library. For example, the storage capacity can be increased by adding additional storage cells, if possible. Moving mass is the amount of mass which must be moved during the transfer of storage media. Generally, a reduction in moving mass increases the speed of movement and improves reliability. Connectivity is the freedom to transfer storage media between specific storage cells and peripheral storage devices. Ideally, a library can transfer any storage medium therein to any peripheral storage device therein. Failure points are the areas where the library is likely to fail. Ideally, a library will contain no single points of failure, thereby improving reliability. Flexibility is the ability to change certain library characteristics, such as the number of accessors or grippers per accessor.

Existing libraries fail to achieve adequate efficiency because of one or more of the aforementioned factors. For example, the libraries disclosed in U.S. Pat. Nos. 4,654,727, 4,864,438 and 4,864,511 each have a robotic accessor mechanism which is a single point of failure relating to all or a portion of the storage media therein. In addition, expandability is inhibited because the vertically arranged storage cells completely surround the accessor. The library disclosed in the '438 and '511 patents can be expanded by interconnecting several silos (a silo is a single accessor and its surrounding storage cells) with mechanical passthru mechanisms. Unfortunately, the passthru mechanism is relatively slow and reduces reliability. Also, expansion can only occur in silo increments, thereby reducing floor space utilization in many installations.

Other libraries may improve upon some of the aforementioned factors, but at the expense of other such factors. To the extent, if any, that machines used outside of the data processing industry (such as jukeboxes) are analogous, the same tradeoffs apply. A heretofore unrecognized and unresolved problem is thus the optimization of the aforementioned factors in automated storage libraries.

SUMMARY OF THE INVENTION

In view of the foregoing, it is the principal object of this invention to improve automated storage libraries.

Another object of this invention is to improve the efficiency of automated storage libraries.

Still another object of this invention is to improve the configuration of automated storage libraries.

These and other objects of this invention are accomplished by an automated storage library including one or more robotic accessors which move upon the surface of a horizontal plane including a plurality of openings to associated storage cells.

The accessors are wireless, remotely controlled vehicles. The vehicles employ known tracking mechanism(s) to move between locations within the library. The storage cells are embedded beneath the horizontal surface. The horizontal plane is a floor which is formed by the surface of the storage cells. Openings in the floor are also the access openings to the storage cells. Storage media are raised and lowered into the storage cells by a picker mechanism on the vehicles.

The configuration of the aforementioned automated storage library improves efficiency. The library may be easily expanded by adding storage cells in either (or both) of two non-vertical directions. Storage cells can be added in any increments thereof. The moving mass is reduced because the vehicle is wireless. Because the direction of vehicle travel is not constrained by rails or other means, any storage media can be transferred to any peripheral storage device, even after the library is expanded. Single points of failure are eliminated by employing multiple vehicles. The library is flexible in that additional vehicles may be added without twisting or entanglement of control cables (because there are none).

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 3 is a schematic of the system electronics of the automated storage library.

DESCRIPTION OF THE PREFERRED EMBODIMENT

Figure 1:
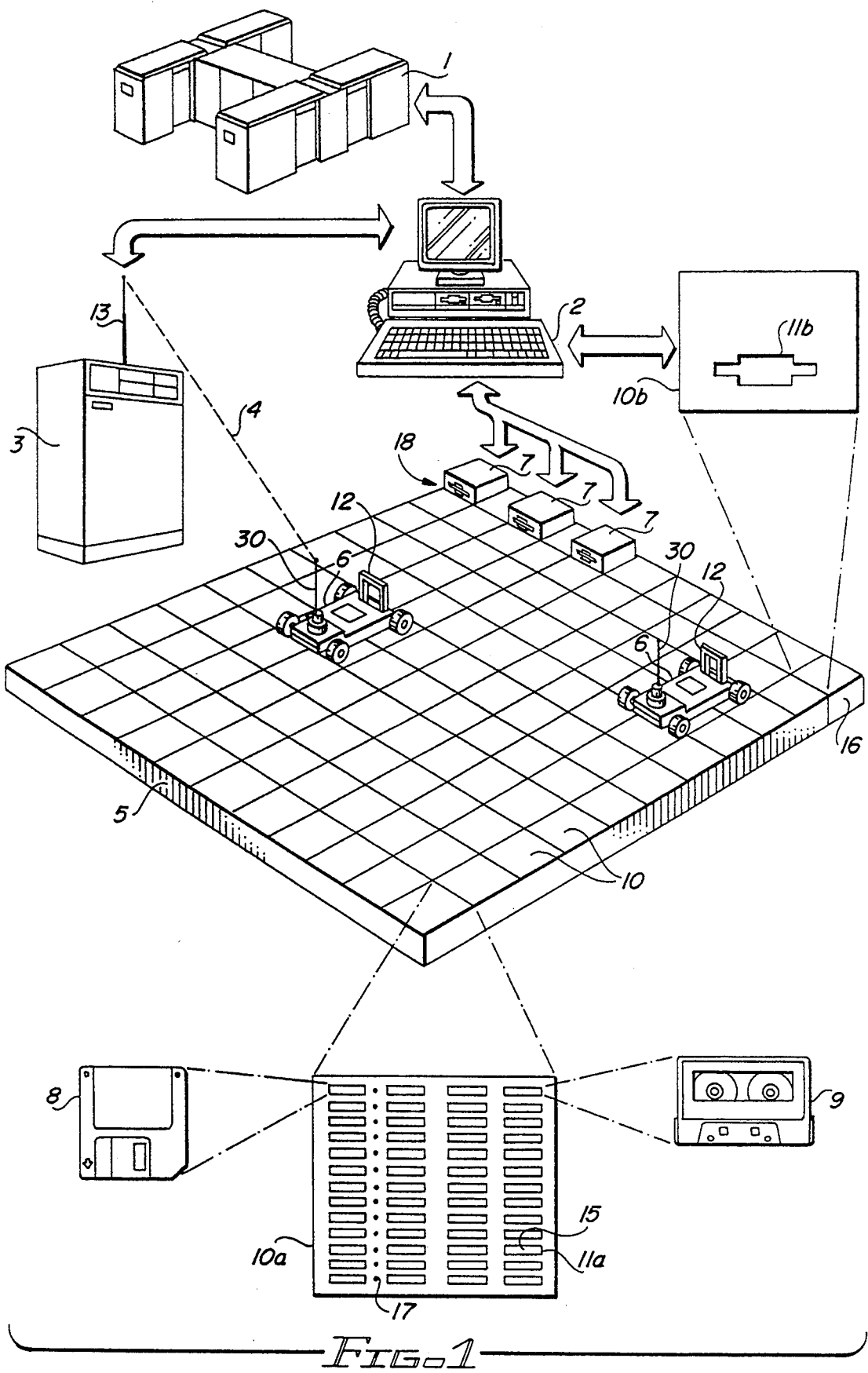
FIG. 1 is a schematic of an automated storage library according to the invention, including a perspective view of the storage cells and robotic accessors.

Referring now more particularly to the drawing, like numerals denote like features and structural elements in the various figures. The automated storage library of the invention will be described as embodied in a magnetic tape and optical disk library for a data processing environment.

As used hereafter, "peripheral storage device" and "automated storage library" also refer to similar devices used outside of the data processing industry, such as jukeboxes.

Referring to FIG. 1, the configuration of the automated storage library is shown attached to a host processor 1. Host processor 1 may be any known host computer system, such as an IBM 3090 mainframe computer running the MVS operating system. Host processor 1 communicates with the library via a library control unit 2. Library control unit 2 may be an IBM PS/2 personal computer running the OS/2 operating system and programmed to control the remainder of the library. Library control unit 2 stores the library configuration file, storage media inventory, error information, etc. and directs the automatic operation of the robotic accessors and peripheral storage devices of the library—such as creating and deleting files on the storage media, writing to and reading from the storage media, transferring the storage media between storage cells and peripheral storage devices, and providing statistics on usage and errors.

The keyboard to library control unit 2 allows a storage administrator to manually enter library operation requests and other information. The coupling of library control unit 2 to other components is represented schematically by arrows. The bus, interface, and protocol for communicating with the other components may be any known in the industry. For example, host processor 1 may be coupled to library control unit 2 using an IBM System/370 or System/390 channel attachment. The remaining features of library control unit 2 are not relevant to the subject invention.

The library includes a floor formed by a plurality of panels 10. A horizontal array of storage cells is embedded beneath most panels 10 in a region 5. Panel 10a is exemplary of other such panels in the library and is magnified to reveal a series of horizontal openings 11a to the storage cells 15. Each storage cell 15 is capable of storing one peripheral data storage medium therein. In the embodiment shown, each storage medium is a magnetic tape cartridge 9 or an optical disk cartridge 8 capable of having data recorded on and read from a magnetic tape or optical disk therein.

The library also includes one or more peripheral storage devices for writing data to and reading data from the storage media in the library. The embodiment shown includes a plurality of optical disk drives 7 and a magnetic tape drive 16. The optical disk drives 7 are set above the floor to expose a series of vertical openings 18 therein. The magnetic tape drive 16 is embedded beneath the floor. Panel 10b is magnified to reveal a horizontal opening 11b therein.

Drives 7 and 16 and cartridges 8 and 9 need not be of any specific type as such details are not relevant to the subject invention. For example, the optical disks may include ablative, phase-change, magneto-optic, or any other active recording layers and may be read-only, write-once, or rewritable, as is known, so long as they are compatible with optical disk drives 7. The magnetic tapes may be metal particle, chromium dioxide, or any other active recording layer, as is known, so long as they are compatible with magnetic tape drive 16. The storage media and devices may be any size form factor, so long as the necessary compatibility is maintained. In addition, the recording formats are not part of the subject invention and may be any known in the art.

The vertical opening 18 in each optical disk drive 7 permits a cartridge 8 to be mounted therein in a horizontal position (i.e. such that the disk is set flat), as is known in the art. Such a position simplifies drives 7 by eliminating the need to compensate for certain gravitational effects during operation, but requires that the library include the capability to rotate a cartridge 8 between its vertical position in a storage cell 15 and its horizontal position in a drive 7. The horizontal opening 11b in magnetic tape drive 16 permits magnetic tape cartridges to be mounted therein in a vertical position (i.e. such that the cartridge is set on its edge), as is known in the art. Such a position permits drive 16 to be embedded beneath the floor and eliminates the need for a cartridge 9 to be rotated between horizontal and vertical positions.

In alternative embodiments, any combination of peripheral storage device numbers, types (magnetic tape drive, optical disk drive, etc.) and orientations (horizontal access opening, vertical access opening, etc.) may be used. For example, in one alternative embodiment, all peripheral storage devices in the library may be oriented to have a horizontal access opening. In another embodiment, all peripheral storage devices may be oriented to have a vertical access opening. In either of these embodiments, all of the devices could be the same type.

Two robotic accessors 6 are four-wheeled vehicles which are capable of moving horizontally upon the surface of the floor. The horizontal movement permits the vehicles to be positioned in proximity above or beside any storage cell or peripheral storage device in the library. A picker mechanism 12 on each vehicle enables it to insert a storage medium in or retrieve a storage medium from a storage cell or peripheral storage device in proximity to a vehicle. The vehicles are wireless, battery or capacitor powered, and remotely controlled. Library control unit 2 includes control algorithms to prevent vehicles 6 from colliding into one another.

Control commands are relayed to each vehicle by a vehicle controller 3. Controller 3 communicates with a vehicle via a controller antenna 13 and a vehicle antenna 30 over a communication channel represented by dotted line 4. The communication channel may be infrared wave, radiowave, microwave, etc. In alternative embodiments, the library may include a different number of vehicles (i.e. one, three, or more), and each vehicle may include a plurality of picker mechanisms 12.

Figure 2:
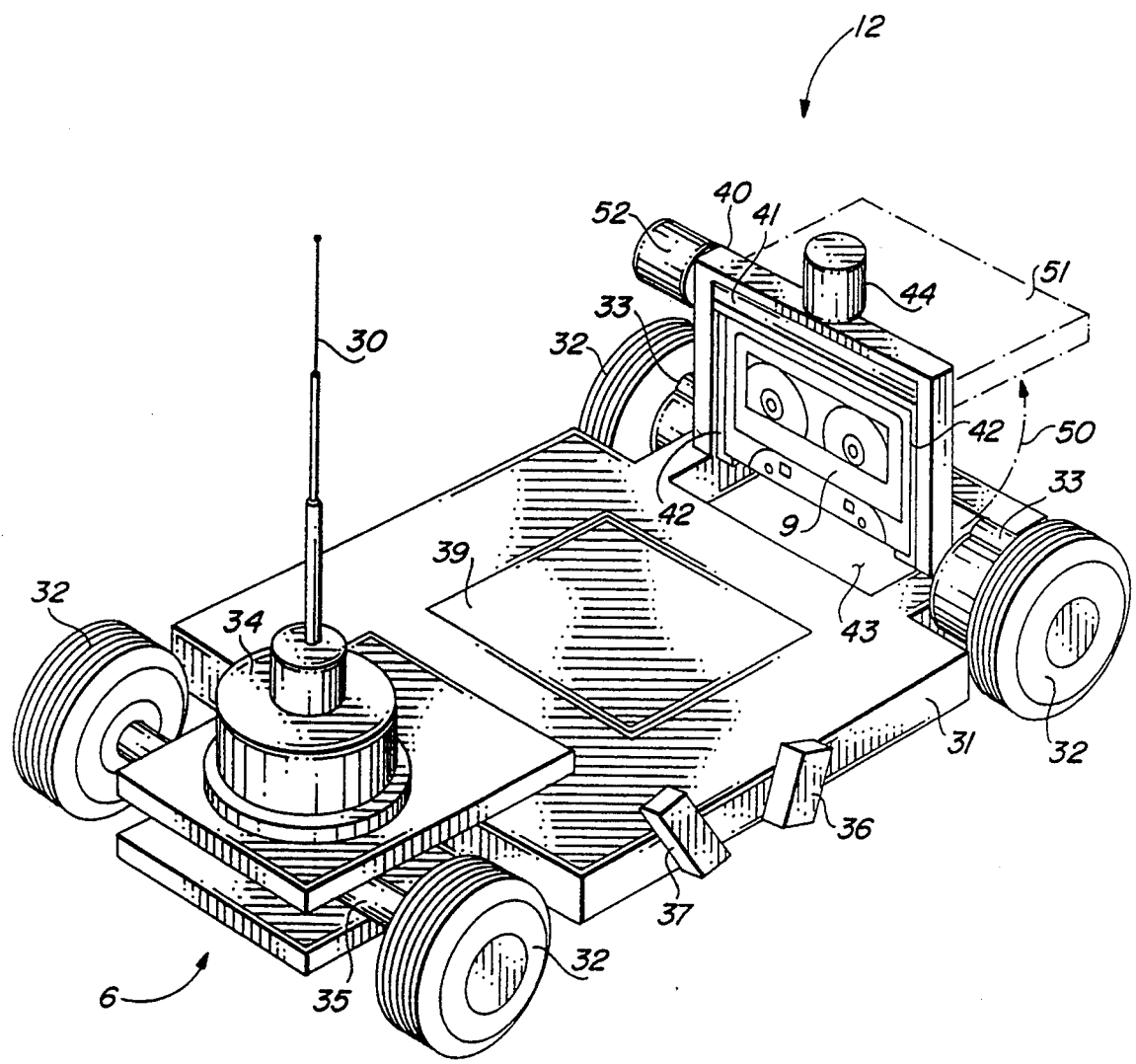
FIG. 2 is a magnified view of a robotic accessor.

Referring to FIG. 2, a vehicle 6 is magnified to reveal additional detail. Control commands received from vehicle controller 3 are distributed to the various vehicle components by vehicle electronics 39. The electrical couplings between electronics 39 and the other components of the vehicle are not shown for convenience. Such couplings may be accomplished using any known technique.

Vehicle 6 includes a chassis and four wheels 32. Each of the two rear wheels are driven by a wheel motor 33. Steering is accomplished by a steering actuator 34 coupled to an axle 35 supporting the two front wheels. Vehicle positioning is accomplished by optically sensing the surfaces of floor panels 10 and drives 7, as is known. A printed pattern of lines 17 on floor panels 10 are sensed and counted to determine the precise position of a vehicle. For such sensing, a light source (i.e. laser, light emitting diode, etc.) 36 emits an optical beam which reflects off of the floor and is detected by photosensor 37. In alternative embodiments, other vehicle positioning techniques may be used, such as optically or mechanically sensing and counting the seams between floor panels 10 and openings 11a to determine the position of a vehicle.

Vehicle 6 also includes a picker mechanism 12. Picker 12 includes a frame 40 in which an axle 41 is slidably and rotatably mounted. Two gripping arms 42 are attached to axle 41 for gripping a cartridge 8 or 9 therein. Detents at the end of the arms opposite axle 41 are used to retain or release the cartridges. As shown in FIG. 2, a magnetic tape cartridge 9 is retained in picker 12 by the detents of arms 42. The cartridge 9 is positioned vertically to enable it to be moved through vehicle chassis opening 43. Actuator 44 drives axle 41 vertically within frame 40 to enable a cartridge to be retrieved from or delivered to a storage cell 15 or a device 16 through opening 43.

To interface with a device 7, picker 12 is capable of rotating arms 42 to a horizontal position. The solid lines in FIG. 2 show picker 12 retaining a cartridge 9 in a vertical position. The rotation of picker 12 is shown by dotted arrow 50 pointing to horizontal position 51. Actuator 52 rotates axle 41 to swing arms 42 and the optical disk cartridge 8 (if any) therein, in the direction of dotted arrow 50. Once arms 42 reach horizontal position 51, actuator 44 enables a cartridge 8 to be retrieved from or delivered to a device 7. Actuator 52 may be reversed to reorient arms 42 to a vertical position as required.

Referring to FIG. 3, the electronics of controller 3 and vehicle 6 are shown schematically. Library control unit 2 is coupled between host processor 1 and controller 3. More specifically, control unit 2 is coupled to a control processor and a picker command generator. The control processor accepts vehicle positioning requests from control unit 2 and generates a target position signal. The target position signal is compared to an actual position signal. The actual position signal is received from vehicle 6 by antenna 13 and is amplified, demodulated, and deserialized before being compared to the target position signal. Depending upon the results of the comparison, a steering command generator and/or a motion command generator may output commands to reposition the vehicle. The picker command generator translates picker action requests from control unit 2 into a form which can be understood by the vehicle. The commands (picker, steering, and motion) are multiplexed, modulated, and amplified before transmission to the vehicle.

The commands are received by antenna 30 of vehicle 6. The commands are amplified, demodulated, demultiplexed before being directed to the proper driver. Picker commands are directed to a picker actuators driver, which then drive the actual electromechanical actions of picker actuators 44 and 52. Steering commands are directed to a steering actuator driver, which then drives the actual electromechanical action of steering actuator 34. Motion commands are directed to a wheel motors driver, which then drives the actual electromechanical actions of wheel motors 33. As the vehicle is positioned about the library, the signal from photosensor 37 is amplified, the lines (seams, openings, etc.) crossed are counted, and the signal is modulated and amplified. The position signal is then transmitted to control unit 3 for use as previously described. In this manner, a feedback loop is operated in which positioning of a vehicle is directed depending upon the desired library operation and the current sensed position of such vehicle.

While the invention has been described with respect to a preferred embodiment thereof, it will be understood by those skilled in the art that various changes in detail may be made therein without departing from the spirit, scope, and teaching of the invention. For example, while the invention has been disclosed in the context of a magnetic tape and optical disk library, similar consideration may make it equally applicable to other types of libraries. In addition, numerous variations in the libraries may be made, such as the number of drives and storage cells. The size of the described library may be modularly altered by adding and deleting peripheral storage devices, or by adding and deleting floor panels in the horizontal plane with storage cells or devices embedded therebelow. Accordingly, the invention disclosed herein is to be limited only as specified in the following claims.

What is claimed is:

1. An automated storage library for storing and retrieving a plurality of data storage media therein, the data storage media capable of storing data thereon for use by a computer, the library comprising:
   a horizontal floor including uncovered openings therethrough;
   a peripheral storage device capable of having one of the data storage media mounted therein for the transmittal of data between the computer and said one of the data storage media;
   a plurality of storage cells embedded beneath the floor, each of the storage cells capable of having one of the data storage media stored therein, each one of the data storage media in the storage cells accessible through a different one of the openings in the floor; and
   an accessor for transferring, in response to the computer, one of the data storage media between the peripheral storage device and any of the storage cells, the accessor capable of moving over substantially an entire surface of the floor by powered wheel means.

2. The automated storage library of claim 1 wherein the accessor is a wireless, remotely controlled vehicle.

3. The automated storage library of claim 1 wherein the floor includes a printed pattern facilitating positioning of the accessor.

4. The automated storage library of claim 1 wherein the accessor transfers the data storage media between a horizontal position in the peripheral storage device and vertical positions in the storage cells.

5. The automated storage library of claim 1 further comprising a plurality of peripheral storage devices each capable of having one of the data storage media mounted therein, the accessor capable of transferring one of the data storage media between any of the peripheral storage devices and any of the storage cells.

6. An automated storage library for storing and retrieving a plurality of data storage media therein, the data storage media capable of storing data thereon for use by a computer, the library comprising:
   a horizontal floor including uncovered openings therethrough;
   a peripheral storage device embedded beneath the floor and capable of having one of the data storage media mounted therein for the transmittal of data between the computer and said one of the data storage media;
   a plurality of storage cells embedded beneath the floor, each of the storage cells capable of having one of the data storage media stored therein, each of the storage cells accessible through one of the openings in the floor; and
   an accessor for transferring, in response to the computer, one of the data storage media between the peripheral storage device and any of the storage cells, the accessor capable of moving over substantially an entire surface of the floor by powered wheel means.

7. The automated storage library of claim 6 wherein the accessor is a wireless, remotely controlled vehicle.

8. The automated storage library of claim 6 wherein the floor includes a printed pattern facilitating positioning of the accessor.

9. The automated storage library of claim 6 further comprising a plurality of peripheral storage devices each embedded beneath the floor and capable of having one of the data storage media mounted therein, the accessor capable of transferring a data storage medium between any of the peripheral storage devices and any of the storage cells.

10. An automated storage library for storing and retrieving a plurality of data storage media therein, the data storage media capable of storing data thereon for use by a computer, the library comprising:
   a horizontal floor including openings therethrough and a printed pattern thereon;
   a plurality of peripheral storage devices each capable of having one of the data storage media mounted therein for the transmittal of data between the computer and said one of the data storage media, at least one of the peripheral storage devices embedded beneath the floor;
   a plurality of storage cells embedded beneath the floor, each of the storage cells capable of having one of the data storage media stored therein, each one of the data storage media in the storage cells accessible through a different one of the openings in the floor; and
   a plurality of wireless, remotely controlled vehicles for transferring, in response to the computer, one of the data storage media between any of the peripheral storage devices and any of the storage cells, each vehicle capable of moving over substantially an entire surface of the floor by powered wheel means, the printed pattern on the floor facilitating positioning of each vehicle.

11. The automated storage library of claim 10 wherein the vehicles transfer the data storage media between a horizontal position in at least one of the peripheral storage devices and vertical positions in the storage cells.

12. An automated storage library for storing and retrieving a plurality of data storage media therein, the data storage media capable of storing data thereon for use by a computer, the library comprising:
   a horizontal floor including slotted uncovered openings therethrough;
   a peripheral storage device capable of having one of the data storage media mounted therein for the transmittal of data between the computer and said one of the data storage media;
   a plurality of storage cells embedded beneath the floor, each of the storage cells capable of having one of the data storage media stored vertically therein; and
   an accessor for transferring, in response to the computer, one of the data storage media between the peripheral storage device and any of the storage cells, the accessor capable of moving over substantially an entire surface of the floor by powered wheel means and being sized relative to the uncovered openings to pass over the uncovered openings without falling therethrough.

13. The automated storage library of claim 12 wherein the uncovered openings each have a length and a width, the length greater than the width, and the accessor includes wheels for enabling movement upon the floor, the wheels having a width greater than the length of the uncovered openings.

14. An automated storage library for storing and retrieving a plurality of data storage media therein, the data storage media capable of storing data thereon for use by a computer, the library comprising:
   a horizontal floor including slotted uncovered openings therethrough and a printed pattern thereon, each of the uncovered openings having a length and a width;
   a plurality of peripheral storage devices each capable of having one of the data storage media mounted therein for the transmittal of data between the computer and said one of the data storage media, at least one of the peripheral storage devices embedded beneath the floor;
   a plurality of storage cells embedded beneath the floor, each of the storage cells capable of having one of the data storage media stored vertically therein, each one of the data storage media in the storage cells accessible through a different one of the openings in the floor; and
   a plurality of wireless, remotely controlled vehicles for transferring, in response to the computer, one of the data storage media between any of the peripheral storage devices and any of the storage cells, each vehicle having wheels capable of moving upon the floor, the wheels having a width greater than the length of the uncovered openings, the printed pattern on the floor facilitating positioning of each vehicle.

* * * * *